US011307587B2

(12) United States Patent
Russell et al.

(10) Patent No.: US 11,307,587 B2
(45) Date of Patent: Apr. 19, 2022

(54) OPERATING AN AUTONOMOUS VEHICLE ACCORDING TO ROAD USER REACTION MODELING WITH OCCLUSIONS

(71) Applicant: WAYMO LLC, Mountain View, CA (US)

(72) Inventors: Jared Stephen Russell, San Francisco, CA (US); Jens-Steffen Ralf Gutmann, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 38 days.

(21) Appl. No.: 17/035,115

(22) Filed: Sep. 28, 2020

(65) Prior Publication Data

US 2021/0109525 A1    Apr. 15, 2021

Related U.S. Application Data

(63) Continuation of application No. 16/220,144, filed on Dec. 14, 2018, now Pat. No. 10,824,148.

(51) Int. Cl.
*G06T 7/70* (2017.01)
*G05D 1/00* (2006.01)
(Continued)

(52) U.S. Cl.
CPC .............. *G05D 1/0088* (2013.01); *G06T 7/70* (2017.01); *G06V 20/58* (2022.01); *G06V 20/588* (2022.01);
(Continued)

(58) Field of Classification Search
CPC .................................................. G05D 1/0088
See application file for complete search history.

(56) References Cited

U.S. PATENT DOCUMENTS 8,457,827 B1    6/2013  Ferguson et al.
8,874,267 B1   10/2014  Dolgov et al.
(Continued)

FOREIGN PATENT DOCUMENTS

JP     2011194979 A    10/2011
JP     2017021735 A     1/2017
(Continued)

OTHER PUBLICATIONS

International Search Report and Written Opinion for Application No. PCT/US2019/064163 dated Mar. 24, 2020.
(Continued)

*Primary Examiner* — Shelley Chen
(74) *Attorney, Agent, or Firm* — Botos Churchill IP Law

(57) ABSTRACT

The disclosure provides a method for operating an autonomous vehicle. To operate the autonomous vehicle, a plurality of lane segments that are in an environment of the autonomous vehicle is determined and a first object and a second object in the environment are detected. A first position for the first object is determined in relation to the plurality of lane segments, and particular lane segments that are occluded by the first object are determined using the first position. According to the occluded lane segments, a reaction time is determined for the second object and a driving instruction for the autonomous vehicle is determined according to the reaction time. The autonomous vehicle is then operated based on the driving instruction.

20 Claims, 11 Drawing Sheets

(51) Int. Cl.
 *G06V 20/58* (2022.01)
 *G06V 20/56* (2022.01)
(52) U.S. Cl.
 CPC .............. *G05D 2201/0213* (2013.01); *G06T 2207/30256* (2013.01); *G06T 2207/30261* (2013.01)

(56) References Cited

U.S. PATENT DOCUMENTS

| | | | |
|---|---|---|---|
| 9,495,874 B1 | 11/2016 | Zhu et al. | |
| 9,694,813 B2 | 7/2017 | Toyoda | |
| 10,627,825 B2* | 4/2020 | Gutmann | B60W 60/0027 |
| 2011/0184605 A1 | 7/2011 | Neff | |
| 2016/0179093 A1* | 6/2016 | Prokhorov | G08G 1/167 701/2 |
| 2017/0016734 A1 | 1/2017 | Gupta et al. | |
| 2019/0025843 A1* | 1/2019 | Wilkinson | G05D 1/0212 |
| 2019/0155292 A1* | 5/2019 | Gutmann | B60W 30/10 |
| 2019/0220011 A1* | 7/2019 | Della Penna | G08G 1/0133 |
| 2019/0256088 A1* | 8/2019 | Sharma | B60W 60/001 |
| 2019/0339706 A1* | 11/2019 | Batur | G06T 7/20 |
| 2019/0367050 A1* | 12/2019 | Victor | B60W 30/0956 |
| 2020/0148204 A1* | 5/2020 | Kunz | B60W 30/162 |

FOREIGN PATENT DOCUMENTS

| | | |
|---|---|---|
| JP | 2017033045 A | 2/2017 |
| JP | 6432948 B2 | 11/2018 |
| JP | 2018195289 A | 12/2018 |
| KR | 100845951 B1 | 7/2008 |
| WO | 2017077598 A1 | 5/2017 |
| WO | 2018147874 A1 | 8/2018 |
| WO | 2018216194 A1 | 11/2018 |

OTHER PUBLICATIONS

Notice of Allowance for Korean Patent Application No. 10-2021-7019879 dated Sep. 14, 2021.
Office Action for Japanese Patent Application No. 2021-532040, dated Jan. 12, 2022.

* cited by examiner

OPERATING AN AUTONOMOUS VEHICLE ACCORDING TO ROAD USER REACTION MODELING WITH OCCLUSIONS

CROSS REFERENCE TO RELATED APPLICATIONS

The present application is a continuation of U.S. patent application Ser. No. 16/220,144, filed Dec. 14, 2018, the entire disclosure of which is incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict trajectories of other objects. These trajectories may define what an object is likely to do for some brief period into the future. These trajectories can then be used to control the vehicle in order to avoid these objects. Thus, detection, identification, and prediction are critical functions for the safe operation of autonomous vehicle.

BRIEF SUMMARY

Aspects of the disclosure provide for a method for operating an autonomous vehicle. The method includes determining, by one or more computing devices, a plurality of lane segments that are in an environment of the autonomous vehicle; detecting, by the one or more computing devices using a detection system of the autonomous vehicle, a first object and a second object in the autonomous vehicle's environment; determining, by the one or more computing devices, a position for the first object in relation to the plurality of lane segments; determining, by the one or more computing devices, one or more lane segments of the plurality of lane segments to be occluded by the first object from a perspective of the autonomous vehicle during a set time interval according to the position; determining, by the one or more computing devices, a reaction time for the second object according to the occluded one or more lane segments; determining, by the one or more computing devices, a driving instruction for the autonomous vehicle according to the determined reaction time of the second object, the driving instruction including a timing for a maneuver of the autonomous vehicle; and operating, by the one or more computing devices, the autonomous vehicle based on the driving instruction.

In one example, determining the one or more lane segments to be occluded includes determining a relationship between a location of the first object and a location of the autonomous vehicle during the set time interval. In this example, determining the relationship between the location of the first object and the location of the autonomous vehicle during the set time interval includes determining an area is blocked from a field of view of the autonomous vehicle at the location during the set time interval.

In another example, the second object is a type of vehicle associated with a nominal human actor. In this example, determining the reaction time includes determining whether the nominal human actor associated with the second object is positioned such that a field of view of the nominal human actor includes the autonomous vehicle's location. Determining the reaction time also optionally includes computing a line segment between an undercarriage of the autonomous vehicle to a predicted location of the nominal human actor.

In a further example, determining the reaction time includes determining a stimulus point at which the second object will most likely begin to react to the autonomous vehicle; and adding an estimated perception time to the stimulus point. In yet another example, the method also includes tracking, by the one or more computing devices, occlusions on the plurality of lane segments by determining one or more second lane segments to be occluded by the first object during a next time interval immediately following the set time interval.

Other aspects of disclosures provide for a self-driving system of an autonomous vehicle. The self-driving system includes a detection system configured to detect objects in an environment of the autonomous vehicle, and one or more computing devices in communication with the detection system. The one or more computing devices are configured to determine a plurality of lane segments that are in the autonomous vehicle's environment; detect, using the detection system, a first object and a second object in the autonomous vehicle's environment; determine a position for the first object in relation to the plurality of lane segments; determine one or more lane segments of the plurality of lane segments to be occluded by the first object from a perspective of the autonomous vehicle during a set time interval according to the position; determine a reaction time for the second object according to the occluded one or more lane segments; determine a driving instruction for the autonomous vehicle according to the determined reaction time of the second object, the driving instruction including a timing for a maneuver of the autonomous vehicle; and operate the self-driving system based on the driving instruction.

In one example, the one or more lane segments are determined to be occluded based on an area that is blocked by the first object from a field of view of the autonomous vehicle during the set time interval. In another example, the second object is a type of vehicle associated with a nominal human actor; and the reaction time is determined based on whether the nominal human actor associated with the second object is positioned such that a field of view of the nominal human actor includes the autonomous vehicle's location. In this example, the reaction time is further determined based on a computed line segment between an undercarriage of the autonomous vehicle to a predicted location of the nominal human actor.

In another example, the reaction time is determined based on a stimulus point at which the second object will most likely begin to react to the autonomous vehicle; and an additional estimated perception time to the stimulus point. In a further example, the one or more computing devices are further configured to track occlusions on the plurality of lane segments by determining one or more second lane segments to be occluded by the first object during a next time interval immediately following the set time interval. In yet another example, the system also includes the autonomous vehicle.

Further aspects of the disclosure provide for a non-transitory, tangible computer-readable storage medium on which computer readable instructions of a program are stored. The instructions, when executed by one or more processors, cause the one or more processors to perform a method. The method includes determining a plurality of lane segments that are in an environment of an autonomous vehicle; detecting, using a detection system of the autonomous vehicle, a first object and a second object in the autonomous vehicle's environment; determining a position for the first object in relation to the plurality of lane segments; determining one or more lane segments of the plurality of lane segments to be occluded by the first object from a perspective of the autonomous vehicle during a set time interval according to the position; determining a reaction time for the second object according to the occluded one or more lane segments; determining a driving instruction for the autonomous vehicle according to the determined reaction time of the second object, the driving instruction including a timing for a maneuver of the autonomous vehicle; and operating the autonomous vehicle based on the driving instruction.

In one example, determining the one or more lane segments to be occluded includes determining a relationship between a location of the first object and a location of the autonomous vehicle during the set time interval. In this example, determining the relationship between the location of the first object and the location of the autonomous vehicle during the set time interval includes determining an area is blocked from a field of view of the autonomous vehicle at the location during the set time interval.

In another example, the second object is a type of vehicle associated with a nominal human actor; and determining the reaction time includes determining whether the nominal human actor associated with the second object is positioned such that a field of view of the nominal human actor includes the autonomous vehicle's location. In this example, determining the reaction time further includes computing a line segment between an undercarriage of the autonomous vehicle to a predicted location of the nominal human actor. In a further example, determining the reaction time includes determining a stimulus point at which the second object will most likely begin to react to the autonomous vehicle; and adding an estimated perception time to the stimulus point.

DETAILED DESCRIPTION

Overview

The technology relates to predicting a behavior of a road user in a vehicle's environment using occluded lane segments in the vehicle's environment. One or more objects may be detected in a vehicle's environment. To determine a timing for a maneuver of the vehicle, such as an unprotected left turn, a predicted behavior for each object of the one or more objects may be determined. The predicted behavior may depend on whether the object is able to see the vehicle and react to the vehicle. As such, determining the predicted behavior may include detecting whether objects that are closer to the vehicle would occlude a lane segment that the object will, or rather, is predicted to travel through.

The features described above may provide more accurate predictions for object behavior and result in a safer, more efficient self-driving system that does not need to recalculate paths as often due to the object behavior being different from what was predicted. In addition, tracking occlusions on a lane segment level as described simplifies the process by using a finite or constant number of lane segments rather than having to solve a complicated multi-body problem. Less computing power may be needed because the system is designed to recognize a more specific area where the multi-body problem needs to be solved. The self-driving system may adjust predictions quicker and react quicker to the objects in its vicinity.

Example Systems

Figure 1:
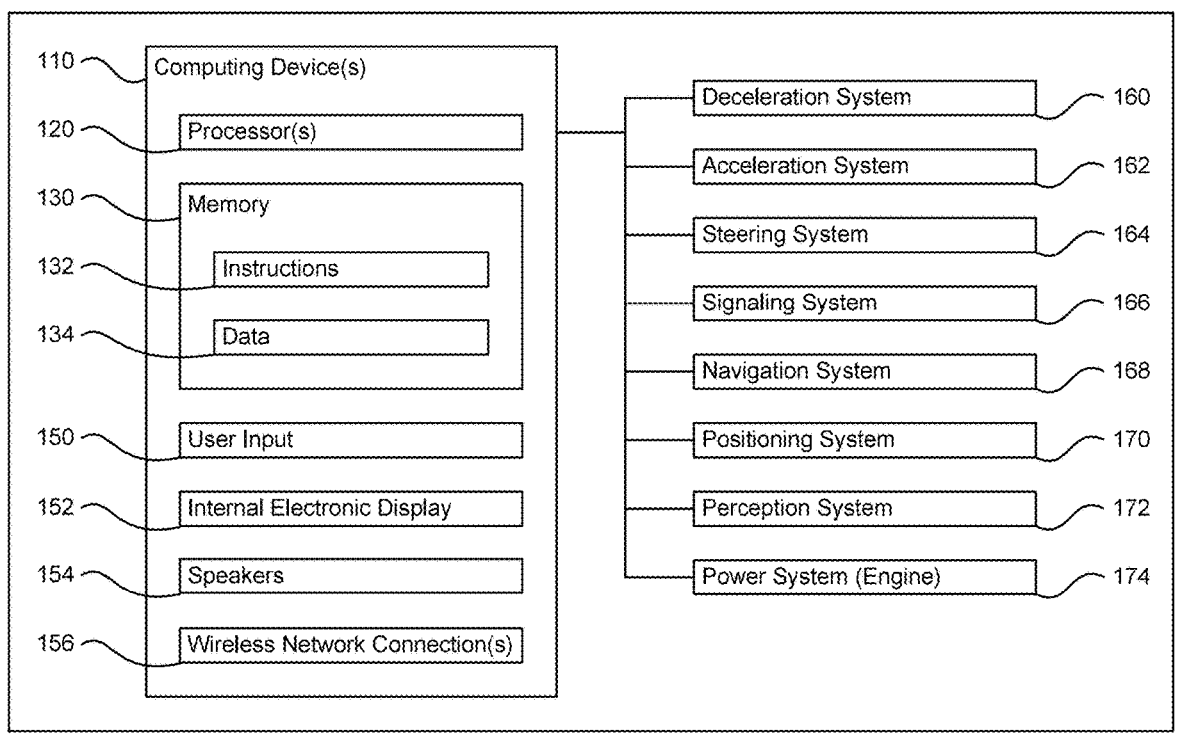
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of the vehicle." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own CPU or other processor, memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100. The computing device 110 of vehicle 100 may also receive or transfer information to and from other computing devices, for instance using wireless network connections 156.

In one example, computing device 110 may be an autonomous driving computing system incorporated into vehicle 100. The autonomous driving computing system may be capable of communicating with various components of the vehicle. For example, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing device 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing device 110.

Figure 2:
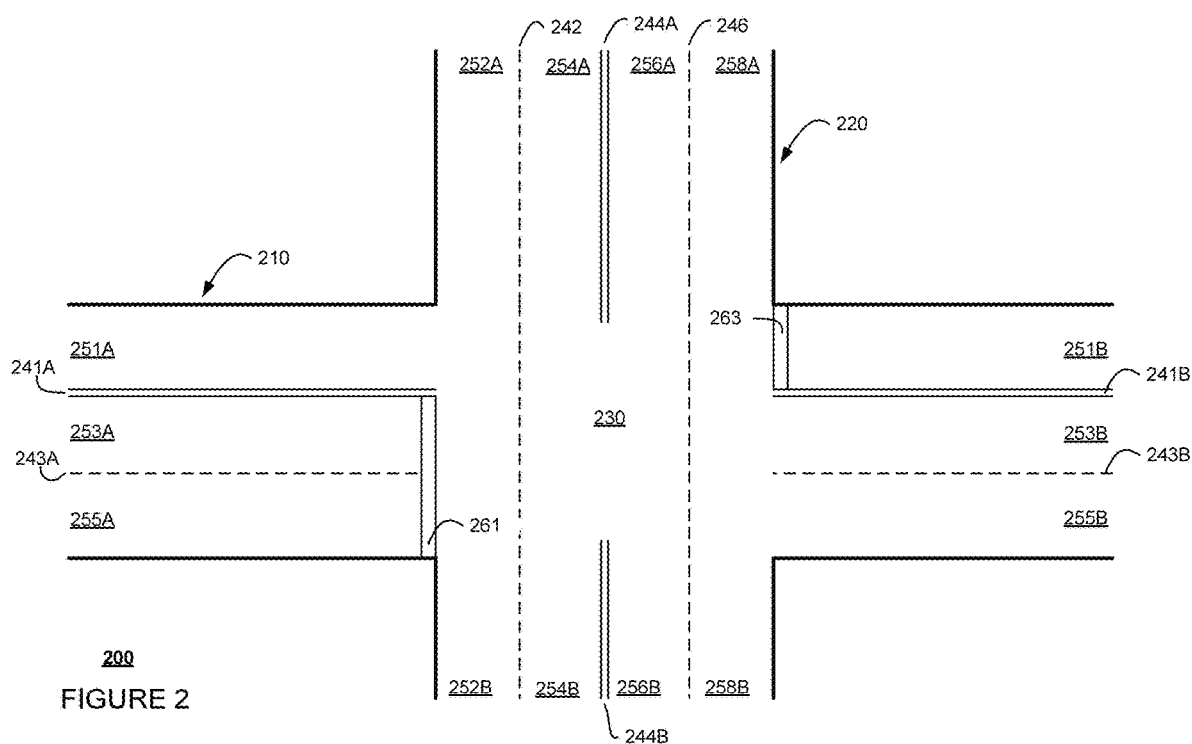
FIG. 2 is an example map information in accordance with aspects of the disclosure.

FIG. 2 is an example of map information 200 for a section of roadway including intersection 230. In this example, map information 200 depicts a portion of the map information that includes information identifying the shape, location, and other characteristics of various features. For example, map information 200 includes road 210 and road 220 intersecting at intersection 230. Map information 200 includes lane markers or lane lines 241A and 243A of road 210 on a first side of intersection 230, lane lines 241B and 243B of road 210 on a second side of intersection 230 opposite the first side. In addition, map information includes lane lines 242 and 246 of road 220 passing through intersection 230 from a third side to a fourth side opposite the third side, lane line 244A of road 220 on the third side of intersection 230, and lane line 244B of road 220 on the fourth side of intersection 230. The lane lines may be different types of lane lines, such as double lane lines 241A, 241B, 244A, and 244B, and broken lane lines 242, 243A, 243B, and 246. The lane lines may also define various lanes, such as lanes 251, 252, 253, 254, 255, 256, and 258. Lane portions 251A, 253A, and 255A of road 210 are on a first side of intersection 230, and lane portions 251B, 253B, and 255B of road 210 are on a second side of intersection 230 opposite the first side. Lane portions 252A, 254A, 256A, and 258A of road 220 are on a third side of intersection 230, and lane portions 252B, 254B, 256B, and 258B of road 220 are on a fourth side of intersection 230 opposite the third side. The lanes may be explicitly identified in the map information 200 as shown, or may be implied by the width of a road. Map information 200 may also identify bicycle lanes. As shown, map information 200 may also include stop lines 261 and 263 for road 210.

In addition to these features, the map information 200 may also include information that identifies the direction of traffic and speed limits for each lane as well as information that allows the computing device 110 to determine whether the vehicle has the right of way to complete a particular maneuver (e.g., to complete a turn or cross a lane of traffic or intersection). Map information 200 may further include information on traffic signs, such as traffic lights, stop signs, one-way sign, no-turn sign, etc. Map information 200 may include information about other environmental features such as curbs, buildings, parking lots, driveways, waterways, vegetation, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing device 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing device 110 periodically and continuously as it is generated by the perception system 172. As discussed in further detail below, computing device 110 may use the positioning system 170 to determine the vehicle's location and perception system 172 to detect and respond to objects when needed to reach the location safely.

Figure 3:
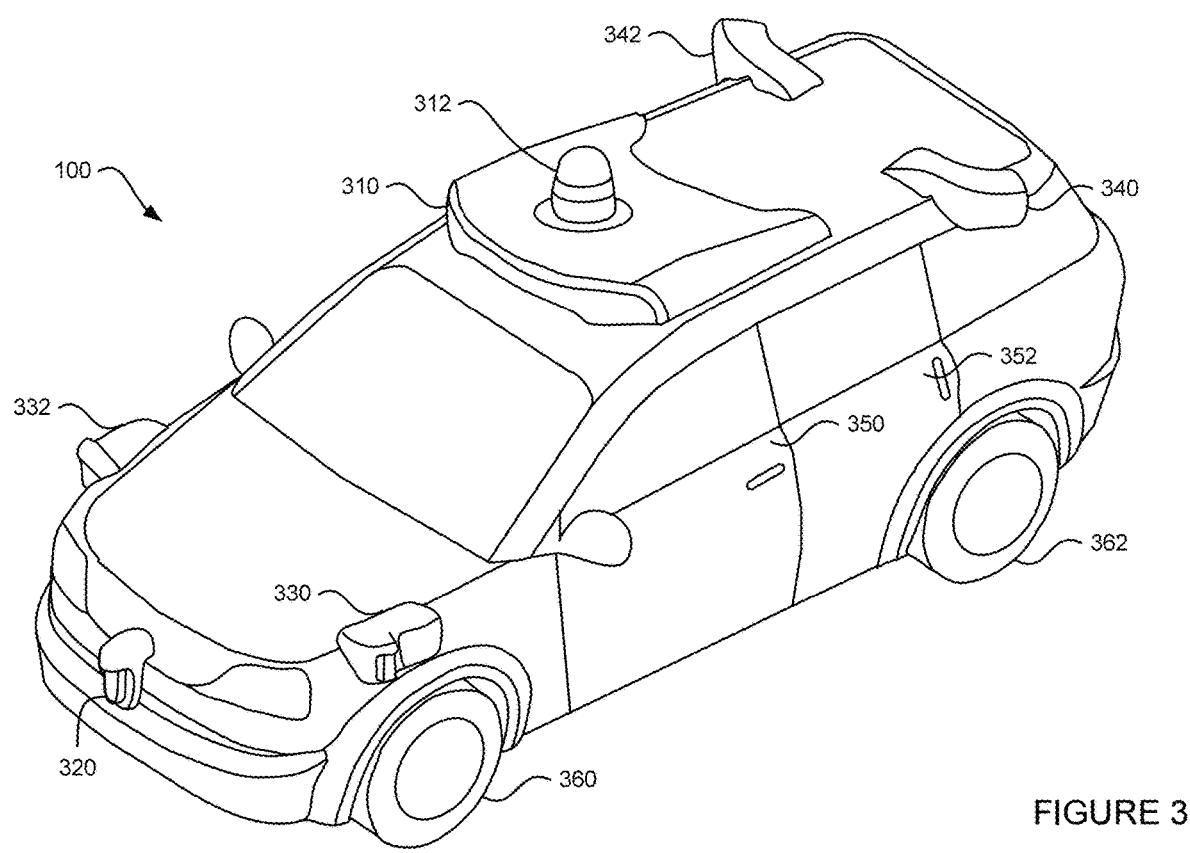
FIG. 3 is an example external view of a vehicle in accordance with aspects of the disclosure.

FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing device 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

Memory 130 may store various models used by computing device 110 to make determinations on how to control vehicle 100. For example, memory 130 may store one or more object recognition models for identifying road users and objects detected from sensor data. For another example, memory 130 may store one or more behavior models for providing the probability of one or more actions being taken a detected object. For another example, memory 130 may store one or more speed planning models for determining speed profiles for vehicle 100 based on map information 200 from navigation system 168 and predicted trajectories of other road users detected by sensor data from perception system 172.

Figure 4:
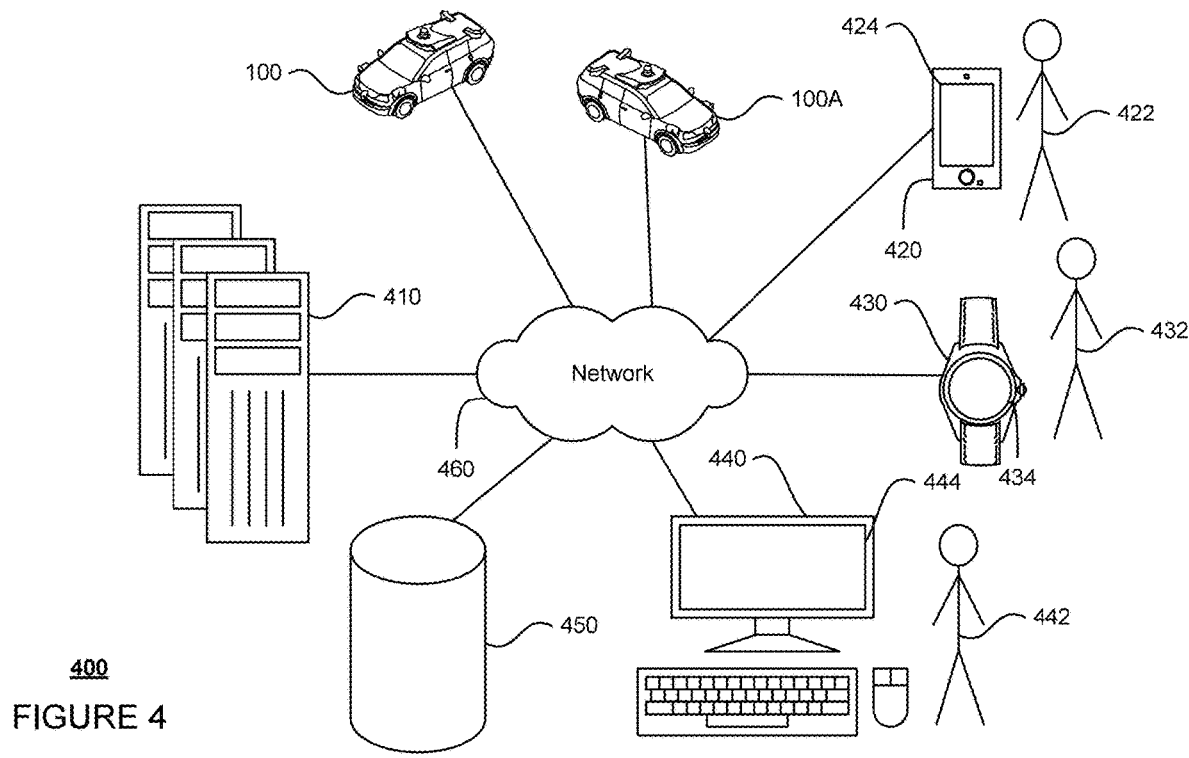
FIG. 4 is an example pictorial diagram of a system in accordance with aspects of the disclosure.
Figure 5:
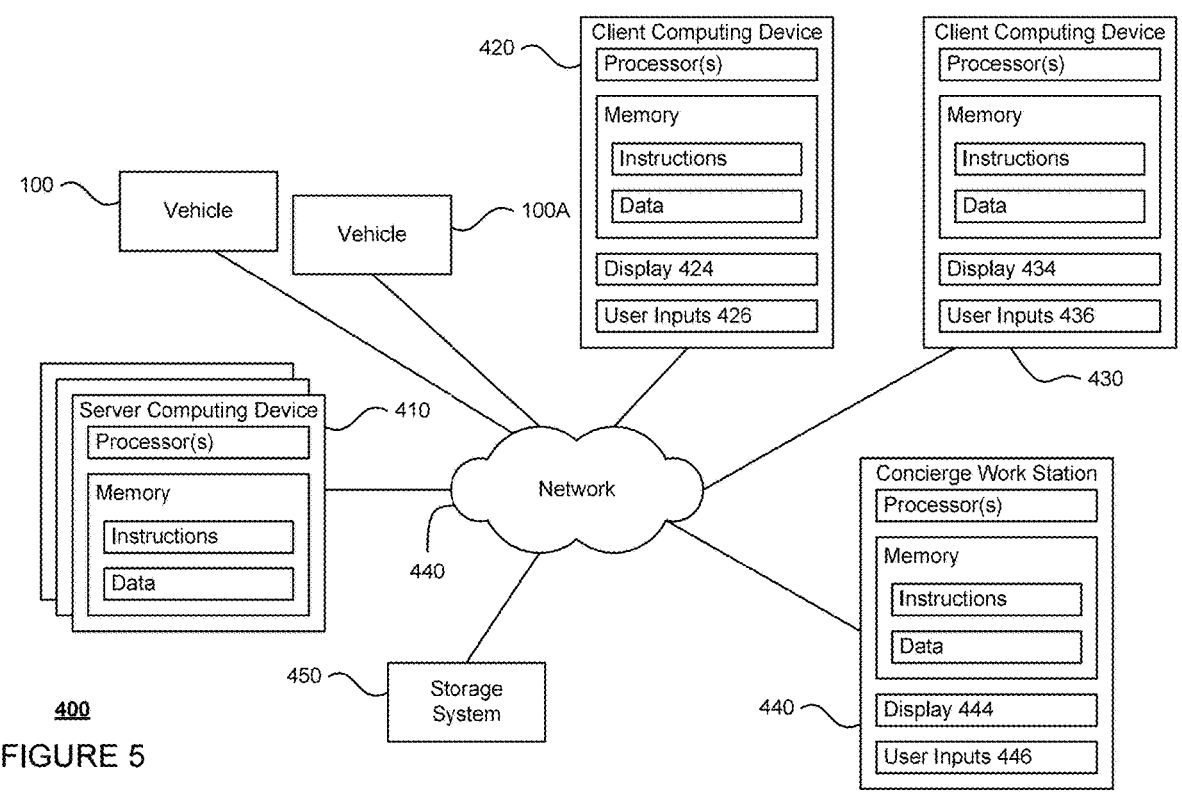
FIG. 5 is an example functional diagram of a system in accordance with aspects of the disclosure.

FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with the computing device 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a CPU), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be remote operator work station used by an administrator to provide remote operator services to users such as users 422 and 432. For example, a remote operator 442 may use the remote operator work station 440 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc. The storage system 450 may further store map information, such as map information 200.

The storage system 450 may also store various models for routing and controlling vehicle 100, such as object recognition models, behavior models, speed planning models, etc. In this regard, the storage system 450 may store data used for training some or all of these models. For example, training data may include images manually labeled with identified objects, videos of trajectories taken by road users in various traffic patterns. The storage system 450 may store other data required for using these models, such as parameters and values.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

Figure 6:
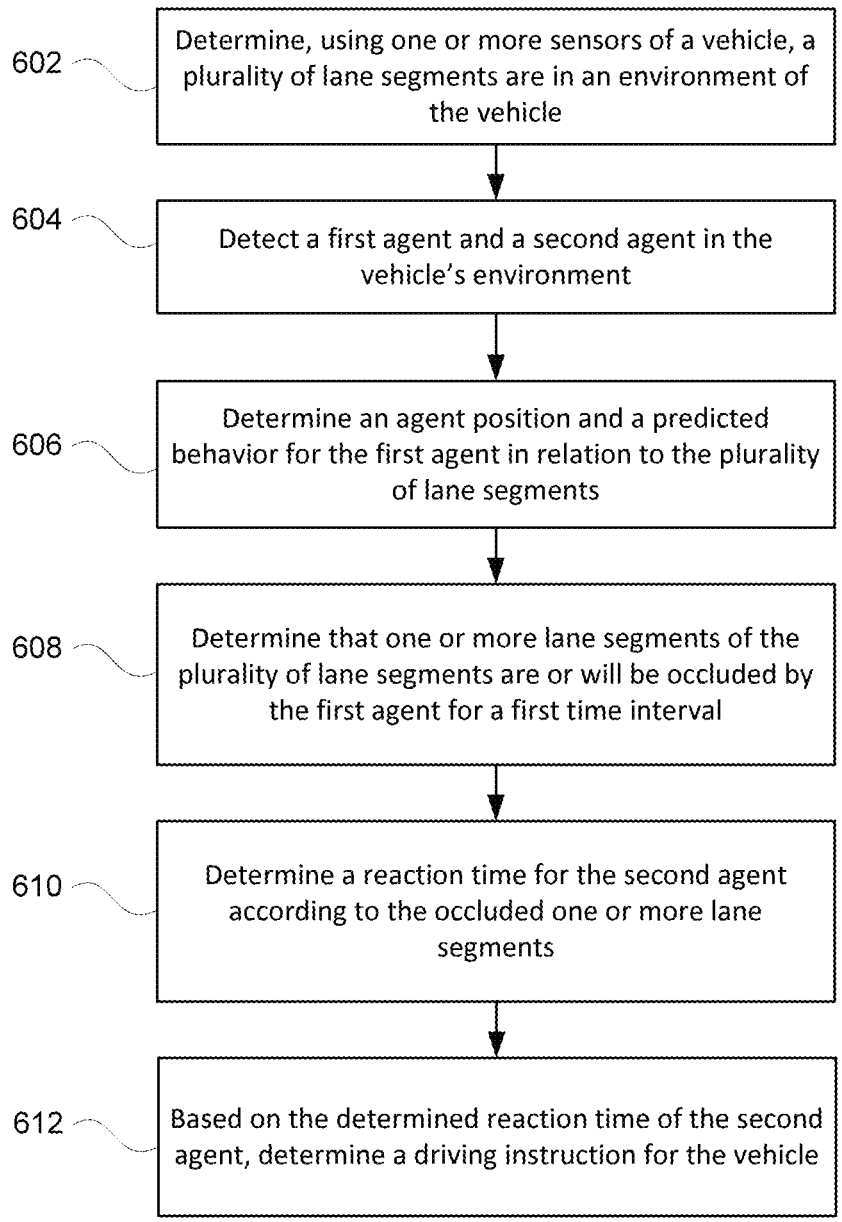
FIG. 6 is a flow diagram 600 of a method for operating a vehicle in accordance with aspects of the disclosure.

In addition to the systems described above and illustrated in the figures, various operations will now be described. The computing device 110 may predict a behavior of a road user in a vehicle's environment using occluded lane segments in the vehicle's environment as described below. In FIG. 6, flow diagram 600 is shown in accordance with aspects of the disclosure that may be performed by the computing device 110. While FIG. 6 shows blocks in a particular order, the order may be varied and that multiple operations may be performed simultaneously. Also, operations may be added or omitted.

At block 602, the computing device 110 determines a plurality of lane segments that are in the vehicle's environment. This determination may be made by detecting traffic control features of the roads within detection range of the vehicle 100 to identify lanes on the roads. For example, the traffic control features that are used to identify lanes on the roads may include lane lines or lane markers. Lane segments may be defined as a set length of a particular lane, such as 10 feet of a lane. The length is a distance between two end points. The length also may be defined as a set area, such as a rectangle or other shape. The plurality of lane segments for the particular lane may be adjacent to one another along the length of the particular lane. In some implementations, determining the plurality of lane segments in the vehicle's environment may include determining a location of the vehicle 100 and accessing map data stored in memory 130 of the vehicle that identifies lane segments in an area encompassing the location of the vehicle. In scenario 700 depicted in FIG. 7, the vehicle 100 may be in lane portion 253A by intersection 230, stopped at stop line 261. The vehicle 100 may have a planned maneuver 702 to cross one or more lanes of road 220. The planned maneuver 702 of the vehicle, illustrated as a dashed line, includes a left turn from lane portion 253A into lane portion 256A of road 220. In the maneuver 702, the vehicle 100 has to cross lanes 252 and 254 of the road 220.

Figure 7:
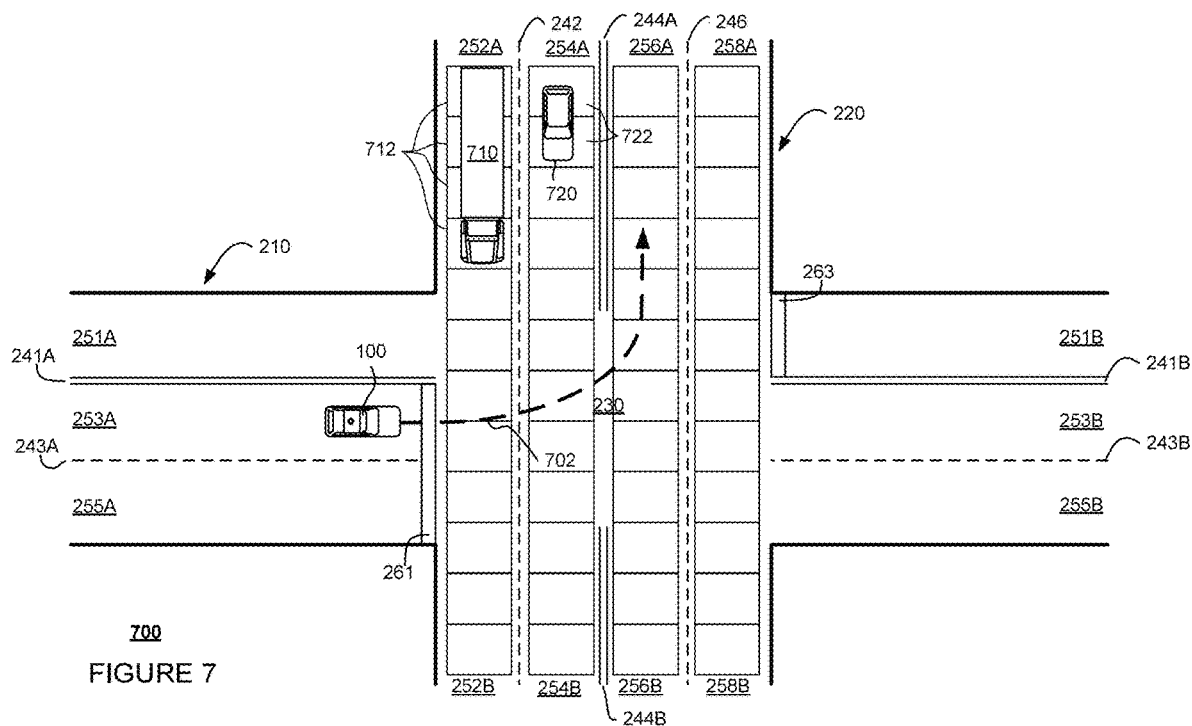
FIG. 7 is an example pictorial diagram of a scenario 700 in accordance with aspects of the disclosure.

For the portion of lane 252 depicted in FIG. 7, twelve (12) lane segments are defined, shown by a plurality of boxed areas arranged end-to-end along the lane 252. The shape of the lane segments may be other shapes or line segments. The portions of lanes 254, 256 and 258 also have approximately twelve lane segments defined, also shown by a plurality of boxed areas arranged end-to-end. These lane segments may be defined by the computing device 110, or may be predetermined and stored in the memory 130 of the vehicle At block 604, the computing device 110 detects a plurality of objects in the vehicle's environment, for instance, using sensor data from the perception system 172. The sensor data may also include characteristics of each object, such as the object's size, shape, speed, orientation, direction, etc. The plurality of objects may include moving and/or stationary objects. In particular, the plurality of objects may include other road users, such as vehicles, bicycles, or pedestrians, or may include other types of obstructions, such as buildings, posts, trees, or construction tools. As shown in FIG. 7, a truck 710 and a sedan 720 are in the vehicle's environment. The computing device 110 may detect, using the perception system 172, the truck 710 and the sedan 720 travelling in lanes 252 and 254, respectively, and classify both the truck 710 and the sedan 720 as road users. The computing device 110 may also identify approximate dimensions and speeds of the truck 710 and the sedan 720 using the perception system 172.

At block 606, the computing device 110 determines position information for each of the plurality of objects in relation to the plurality of lane segments. The position information may include a location of each object and an orientation of each object. For a first object of the plurality of road users, the computing device 110 may detect a location of the first object relative to the detected traffic control features. In some other implementations, the location of the first object relative to the vehicle's location may be detected and identified using map data stored in the memory of the vehicle. In some implementations, the position information may also include predicted behavior of each object, such as a trajectory. For example, the predicted behavior may include a trajectory of the first object that is determined based on the speed, orientation, and/or direction of the first object detected by the perception system 172. The predicted behavior may be that the first object remains fixed when the first object is a stationary object.

In the scenario 700, the computing device 110 may determine that the truck 710 is in lane portion 252A based on the truck's location between lane line 242 and the edge of road 220 and/or the truck's location on lane segments 712. The computing device 110 may also determine that the truck 710 has an orientation pointing towards lane portion 252B. Similarly, the computing device 110 may determine that the sedan 720 is in lane portion 254A based on the sedan's position between lane lines 242 and 244A and/or the sedan's position on lane segments 722. The computing device may also determine that the sedan 720 has an orientation pointing towards lane portion 254B. Regarding predicted behavior, the truck's predicted behavior includes driving down lane portion 252A towards the intersection 230 over the first time interval at a constant speed or within 5 mph within a current speed. The sedan's predicted behavior includes driving down lane portion 254A towards the intersection 230 over the first time interval at a constant speed or within 5 mph within a current speed. The speed of the sedan 720 over the first time interval may be greater than the speed of the truck 710.

At block 608, the computing device 110 further determines that one or more lane segments of the plurality of lane segments are or will be occluded by at least one of the plurality of objects for a first time interval. The first time interval may be set as, for example, five (5) seconds, or more or less. Determining that the one or more lane segments are or will be occluded for the first time interval may include determining the relationship between the location of each object, including for example, the first object, and the vehicle's location during the first time interval. A start of the first time interval may be a current or future time. When determining that the one or more lane segments will be occluded at a future point in time, a predicted location of a given object may be determined based on the position and predicted behavior of the given object.

Occlusions may include one or more areas that are blocked by the plurality of objects from a field of view of the vehicle 100 during the first time interval. These blocked areas may be identified based on the relationship between the locations. In particular, blocked areas may include areas that fall behind a current or predicted location of the given object of the plurality of objects from the point of view of the vehicle 100. The field of view of the vehicle 100 may be defined by the sensors of and the sensor data generated by the perception system 172. The field of view may include areas in the sensor data within an angular range extending from the location of the vehicle 100 and within a distance from the location of the vehicle 100. Any lane segments that are in the one or more areas may be determined to be occluded during the first time interval.

Figure 8A:
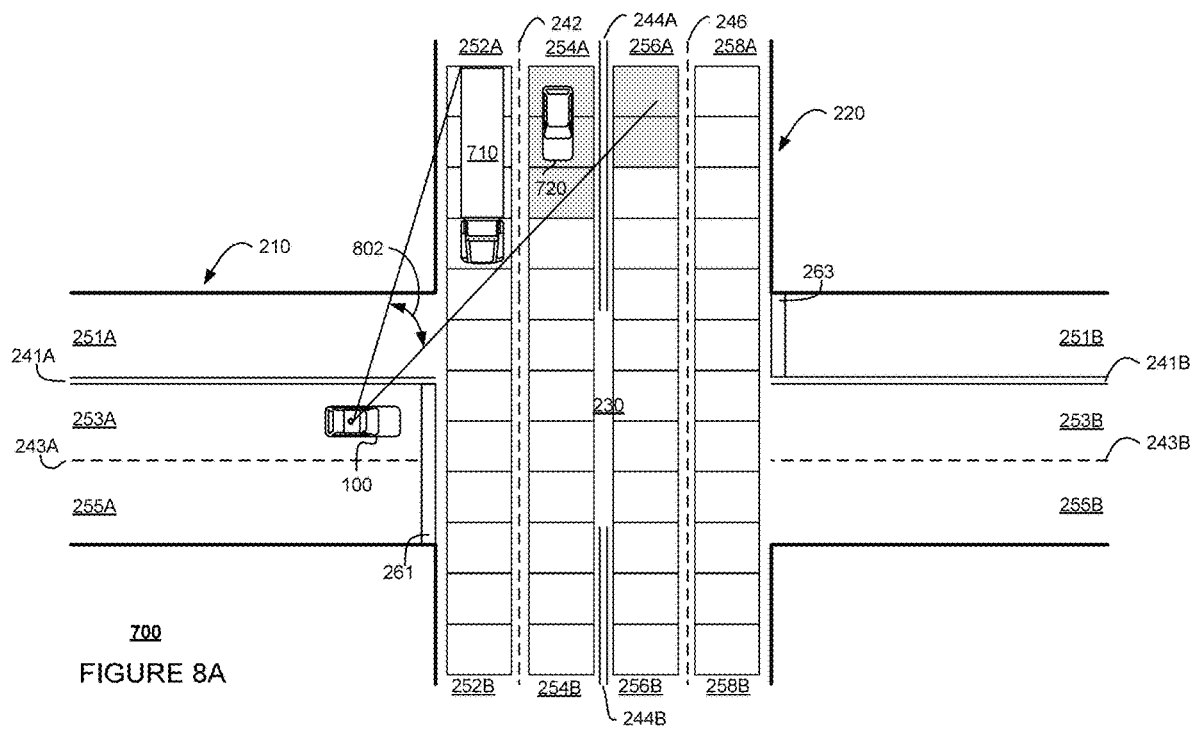
FIGS. 8A and 8B are further example pictorial diagrams of the scenario 700 in accordance with aspects of the disclosure.
Figure 8B:
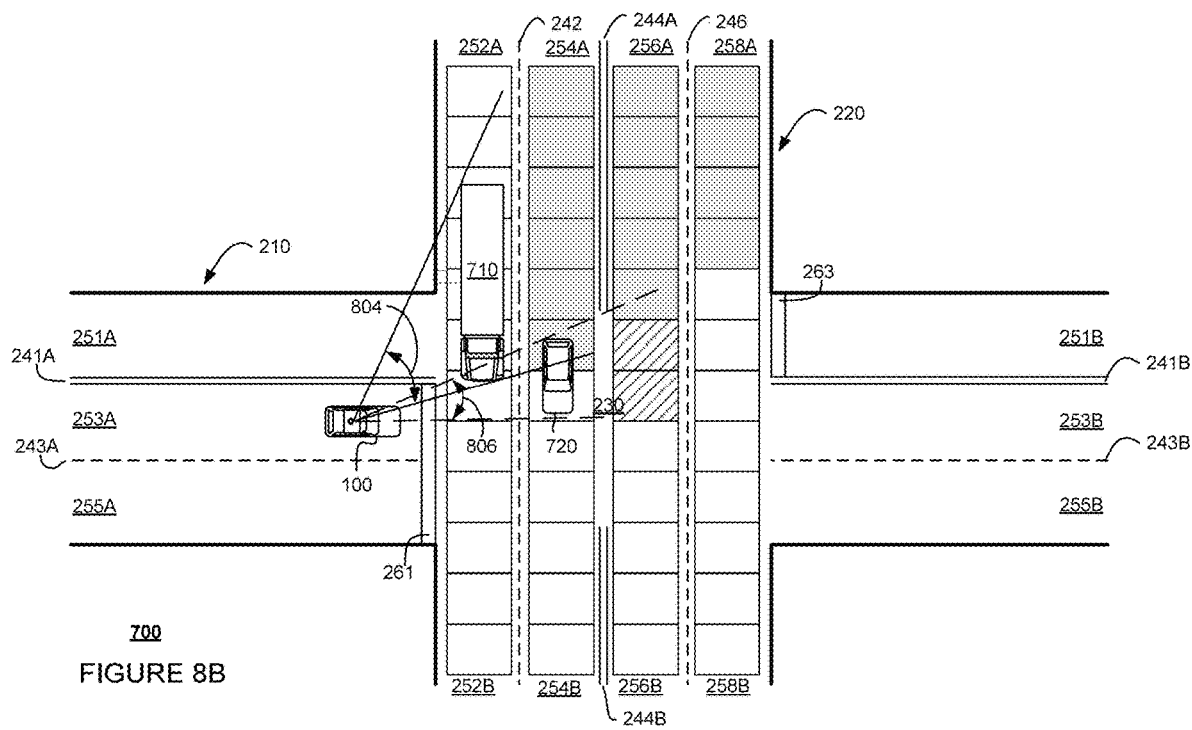

In scenario 700, the computing device 110 determines one or more lane segments that are occluded by the truck 710. FIG. 7 and FIG. 8A show locations of the truck 710 and the sedan 720 at a start of the first time interval. As shown, the truck 710 and the sedan 720 are driving next to each other, with the sedan 720 more proximal to a back of the truck 710 than a front of the truck. FIG. 8B shows predicted future locations of the truck 710 and the sedan 720 at an end of the first time interval. As shown, both the truck 710 and the sedan 720 are predicted to drive down their respective lane portions 252A and 254A, with the sedan 720 predicted to drive at a greater speed than the truck 710, such that the sedan 720 will be more proximal to the front of the truck 710 and begin to surpass the truck 710 by a length at the end of the first time interval.

The computing device 110 may project the field of view as the truck 710 and the sedan 720 moves between the start and the end of the first time interval. At the start of the first time interval, three (3) lane segments in lane portion 254A and two (2) lane segments in lane portion 256A are occluded by the truck 710, shown by the field of view portion 802 and the shading of the occluded lane segments in FIG. 8A. Additional lane segments in other map information may also be determined as occluded. At the end of the first time interval, six (6) lane segments in lane portion 254A, five (5) lane segments in lane portion 256A, and four (4) lane segments in lane portion 258A are occluded by truck 710, shown by the field of view portion 804 and the shading of the occluded lane segments in FIG. 8B. The occluded lane segments for the first time interval are all the lane segments that are blocked from view over the entire time interval. The computing device 110 also determines lane segments that are occluded by other objects of the plurality of objects, such as the sedan 720. For example, an additional two (2) lane segments in lane portion 256A that are occluded by the sedan 720 when it surpasses the truck 710, as shown by the field of view portion 806 and the hatching in of the occluded lane segments in FIG. 8B.

At block 610, the computing device 110 then determines a reaction time for at least one object of the plurality of objects, such as the second object, according to the occluded one or more lane segments. The reaction time is a point in time at which an object is able to adjust its behavior in response to a current or planned behavior of the vehicle 100, such as by slowing down or speeding up. The at least one object for which the reaction time is determined may be one or more objects that are classified as an road user in the vehicle's environment, such as the truck 710 and the sedan 720. In addition, the at least one object may be one or more objects that are predicted to be in the occluded one or more lane segments during the first time interval according to the predicted behavior of the at least one object, such as the sedan 720 which is predicted to travel through the occluded lane segments, as shown in FIGS. 8A and 8B.

The reaction time may be a predicted point in time and/or location that a given object may be expected to be aware of and begin reacting to the autonomous vehicle 100. Awareness of the given object may be assessed based on the location and orientation of the given object or a nominal human actor associated with the given object relative to the vehicle 100. The nominal human actor associated with the given object may be an operator of a road user, such as a driver of a vehicle or a cyclist on a bicycle, or a pedestrian. For example, the given object is determined to be aware of the vehicle 100 when the given object is not in an occluded lane segment and is oriented such that a field of view of the associated nominal human actor includes the vehicle's location. The field of view of a nominal human actor may be limited to a forward-facing angular range less than 180°.

Figure 9:
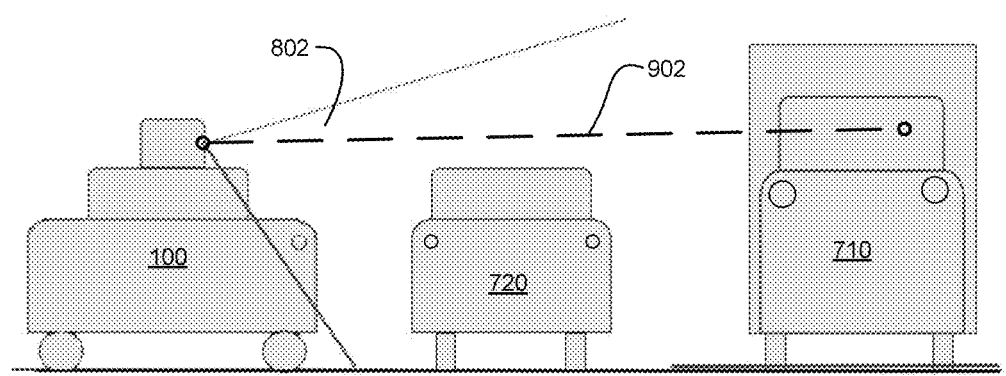
FIG. 9 is a pictorial diagram of a scenario 900 in accordance with aspects of the disclosure.

For objects that are in the occluded one or more lane segments, determining the reaction time may include determining whether an associated nominal human actor is positioned such that the field of view of the nominal human actor includes the vehicle's location, regardless of being in an occluded lane segment. Even when an object, like a car, is in a lane that is occluded behind another object, a human actor, such as a driver of the vehicle, may still be in a position where he or she is able to see the autonomous vehicle 100 and react to the autonomous vehicle 100. This determination may include detecting that a location of the nominal human actor associated with a given object in an occluded lane segment is in the field of view of the vehicle 100 and the given object is oriented such that a field of view of the associated nominal human actor includes the vehicle's location. Alternatively, the determination may include determining that the field of view of the associated nominal human actor may include a minimum amount of the vehicle 100. The minimum amount may be 30%, 50%, or 70% of a surface area of the vehicle 100. The location of the nominal human actor may be detected using the perception system 172 of the vehicle 100 or may be determined based on, for example, an average height of a nominal human actor's eyes above a surface of the road when driving. The location of a nominal human actor may also be determined based on a predicted location of a driver in a vehicle given the location and orientation of the vehicle. In a scenario 900 shown in FIG. 9, where the positions of truck 710 and the sedan are swapped from the positions in scenario 700, the computing device 110 may detect a truck driver in a far right quarter of a cabin of the truck 710 relative to the orientation of the vehicle and determine that the vehicle 100 is in a field of view of the truck driver. For example, a line segment 902 may be computed between the detected location of the truck driver and the vehicle 100, and the line segment 902 may be in the estimated field of view of the truck driver. Alternatively, an amount of the vehicle in the estimated field of view of the truck driver may be estimated to be greater than the minimum amount.

In other implementations, determining whether an associated nominal human actor is positioned such that the field of view of the nominal human actor includes the vehicle's location may include computing whether a line segment between a lowest point of a body of the vehicle 100 and a location of a nominal human actor associated with a given object in the occluded one or more lane segments intersects any obstacles. An undercarriage of the vehicle 100 may be the lowest point of the body of the vehicle 100. When an obstacle intersects the line segment, the given object is determined to be unaware of the vehicle 100 and unable to react to the vehicle 100. In addition, when the line segment between a lowest point of a body of the vehicle 100 and a location of a nominal human actor is not within the field of view of the nominal human actor, the given object is also determined to be unaware of the vehicle 100 and unable to react to the vehicle. Alternatively, the given object may be determined to be unaware of the vehicle 100 and unable to react to the vehicle when the portion of the vehicle within the field of view of the nominal human actor is less than the minimum amount of the vehicle.

Figure 10:
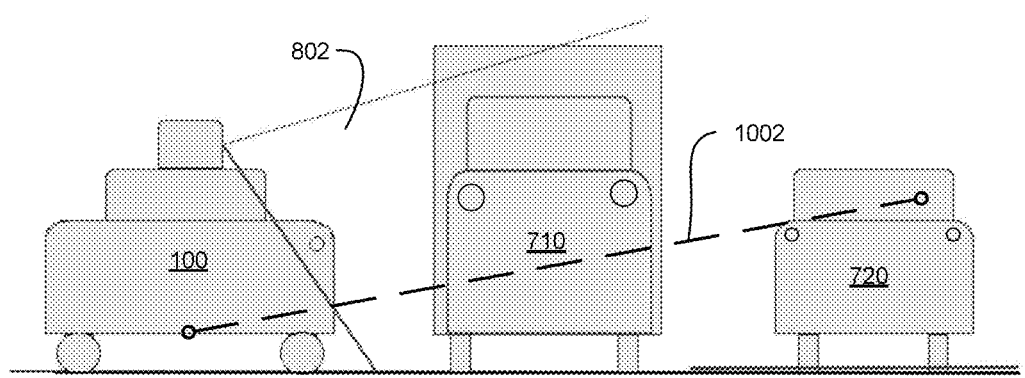
FIG. 10 is a pictorial diagram of the scenario 700 in accordance with aspects of the disclosure.

FIG. 10 is another pictorial diagram of the scenario 700 corresponding to the start of the first time shown in FIG. 8A, where sedan 720 is in an occluded lane segment. A line segment 1002 may be computed between an undercarriage of the vehicle 100 and a predicted location of a nominal human driver of the sedan 720. The undercarriage is determined as a center of bottom of the vehicle's body. The predicted location of the nominal human driver is determined as in a far right quarter of a cabin of the sedan 720 as viewed from the perspective of the vehicle 100, given the orientation of the sedan 720 down lane portion 252A towards lane portion 252B. The line segment 1002 intersects a body of the truck 710. Therefore the computing device 110 may determine that the sedan 720 is unaware of the vehicle 100 at the start of the first time interval, and also that the reaction time for the sedan 720 is after the start of the first time interval.

Determining the reaction time may include adjusting the predicted behavior of the given object when the given object is travelling in occluded one or more lane segments. In particular, it may be assumed that the one or more objects will not react to the vehicle 100 when travelling in the occluded one or more lane segments during the first time interval. For example, the second object, such as the sedan 720, may maintain a same or similar speed when travelling through one or more occluded lane segments during the first time interval because the second object most likely will not see the vehicle 100 to slow down or speed up for the vehicle 100.

Determining the reaction time may also include determining a stimulus point at which each of the plurality of objects will most likely begin to react to the vehicle 100 and adding an estimated perception time. The stimulus point for a given object, such as the second object, may be determined to be a point in time where the given object reaches the end of the one or more occluded lane segments or reaches a minimum distance past the one or more occluded lane segments. The minimum distance may be where a minimum amount of the vehicle 100 becomes visible to a nominal human actor associated with the second object. A perception time, such as 0.5 seconds, 1.5 seconds, or another time, may also be added to a determined stimulus point in order to account for the time it takes a nominal human actor to process visual stimuli and then react to the visual stimuli, such as moving a foot and applying the brake. The perception time may also include the amount of time in which it takes for a nominal human actor to notice the vehicle 100. If the given object does not reach the end of the one or more occluded lane segments during the first time interval, no stimulus point would be determined for the given object.

In scenario 700, the computing device 110 may determine the reaction time for the sedan 720. Because the sedan 720 is in the lane segments that are occluded by the truck 710 for a majority of the first interval, as shown in FIGS. 8A and 8B, the sedan 720 may be predicted to travel through the occluded lane segments without any reaction to the vehicle 100, such as maintaining a constant speed. At the end of the first interval, the length at which sedan 720 surpasses the truck 710 may be equal to the minimum distance for the vehicle 100 to become visible to a nominal human actor in the sedan 720. Therefore, the end of the first interval may be determined by the computing device 110 as the stimulus point for the sedan 720. The reaction time for the sedan 720 is then determined as 1.5 seconds after the end of the first time interval.

At block 612, based on the determined reaction time of the plurality of objects, the computing device 110 determines a driving instruction for the vehicle 100. The driving instruction for the vehicle 100 includes a timing for a maneuver of the vehicle 100 that depends on the reaction time of one or more of the plurality of objects. For example, the maneuver may be an unprotected left turn across a single lane or a multi-lane road. This maneuver depends on the reaction time of the objects in the multi-lane road that the vehicle 100 needs to cross to make the left turn. The maneuver may be another type of unprotected maneuver, such as a crossing of the intersection or a right turn. To determine the timing for the maneuver, the computing device 110 may use the predicted behavior for each of the plurality objects after the corresponding reaction time to select the timing for the maneuver when the vehicle 100 has enough time to complete the maneuver given the trajectories and the predicted behaviors of the one or more objects. In some implementations the predicted behavior is only determined for a subset of the objects that have trajectories that may intersect with the trajectory of the maneuver.

In the scenario 700, the computing device 110 determines a timing for the planned maneuver 702 for the vehicle 100 to make an unprotected left turn across intersection 230 onto the multi-lane road 220. As the reaction time of sedan 720 is predicted to be the end of the first time interval, the computing device 110 determines the timing for the planned maneuver 702 to be after the first time interval. In particular, the timing may be after both the truck 710 and the sedan 720 passes through the intersection 230 rather than before because the sedan 720 will likely reach the intersection without seeing and reacting to the vehicle 100.

In further examples, the computing device 110 may continue to track occluded lane segments by determining a next one or more lane segments will be occluded by at least one of the plurality of objects during a second time interval immediately following the first time interval. The second time interval may be the same length of time as the first time interval or more or less. Determining this next one or more lane segments may be based on the relationship between the predicted location of each object and the vehicle's location during the second time interval. The determination of occluded lane segments may therefore be repeated as needed until the driving instruction is determined for the vehicle.

In some other implementations, a reaction time may be determined for a hypothetical third object in the occluded one or more lane segments. When occluded lane segments are partially or completely undetectable by the perception system 172 of the vehicle 100, it would be advantageous for the computing device 110 to determine the reaction time for hypothetical objects that may be in the occluded lane segment. In doing so, the computing device 110 may be able to plan maneuvers for the vehicle 100 that take into account possibly undetected objects. The hypothetical third object may be assumed to have an associated nominal human actor and be in at least one of the occluded lane segments, traveling with traffic. The hypothetical third object may be assumed to have average characteristics, such as average speed or acceleration, for a vehicle traveling in a lane including the at least one occluded lane segment. The reaction time for the hypothetical third object may be determined as described in block 610 for objects in occluded lane segments.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for operating an autonomous vehicle, the method comprising:
   detecting, by one or more computing devices using a detection system of the autonomous vehicle, a first object and a second object in the autonomous vehicle's environment;
   determining, by the one or more computing devices, one or more lane segments to be occluded by the first object from a perspective of the autonomous vehicle during a set time interval according to a positional relationship between the first object and the one or more lane segments;
   determining, by the one or more computing devices, a reaction time for the second object according to the occluded one or more lane segments; and
   operating, by the one or more computing devices, the autonomous vehicle based on the determined reaction time.

2. The method of claim 1, wherein the positional relationship includes a predicted trajectory of the first object during the set time interval.

3. The method of claim 1, wherein determining the one or more lane segments to be occluded includes identifying an area that is blocked from a field of view of the autonomous vehicle based on the positional relationship.

4. The method of claim 3, wherein identifying the area that is blocked from the field of view of the autonomous vehicle based on the positional relationship includes:
   projecting the field of view of the autonomous vehicle from a location of the autonomous vehicle; and
   determining the one or more lane segments that are behind the first object relative to the projected field of view.

5. The method of claim 1, wherein:
   the second object is a type of vehicle associated with a nominal human actor; and
   determining the reaction time includes predicting when the nominal human actor associated with the second object will react to the autonomous vehicle.

6. The method of claim 5, wherein predicting when the nominal human actor associated with the second object will react to the autonomous vehicle includes determining when a field of view of the nominal human actor includes a minimum amount of the autonomous vehicle.

7. The method of claim 1, wherein determining the reaction time includes:
   determining a stimulus point at which the second object will most likely begin to react to the autonomous vehicle; and
   adding an estimated perception time to the stimulus point.

8. A system comprising:
   a detection system configured to detect objects in an environment of an autonomous vehicle, the detected objects including a first object and a second object; and
   one or more computing devices in communication with the detection system, the one or more computing devices being configured to:
      determine one or more lane segments to be occluded by the first object from a perspective of the autonomous vehicle during a set time interval according to a positional relationship between the first object and the one or more lane segments;
      determine a reaction time for the second object according to the occluded one or more lane segments; and
      operate the autonomous vehicle based on the reaction time.

9. The system of claim 8, wherein the positional relationship includes a predicted trajectory of the first object during the set time interval.

10. The system of claim 8, wherein the one or more computing devices are configured to determine the one or more lane segments to be occluded based on an area identified that is blocked from a field of view of the detection system based on the positional relationship.

11. The system of claim 8, wherein:
    the second object is a type of vehicle associated with a nominal human actor; and
    the reaction time is determined based on a predicted point in time when the nominal human actor associated with the second object will react to the autonomous vehicle.

12. The system of claim 11, wherein the reaction time is further determined based on when a field of view of the nominal human actor includes a minimum amount of the autonomous vehicle.

13. The system of claim 8, wherein the reaction time is determined based on:
    a stimulus point at which the second object will most likely begin to react to the autonomous vehicle; and
    an additional estimated perception time to the stimulus point.

14. The system of claim 8, further comprising the autonomous vehicle.

15. A non-transitory, tangible computer-readable storage medium on which computer readable instructions of a program are stored, the instructions, when executed by one or more processors, cause the one or more processors to perform a method, the method comprising:
    detecting, using a detection system of an autonomous vehicle, a first object and a second object in the autonomous vehicle's environment;
    determining one or more lane segments to be occluded by the first object from a perspective of the autonomous vehicle during a set time interval according to a positional relationship between the first object and the one or more lane segments;
    determining a reaction time for the second object according to the occluded one or more lane segments; and
    operating the autonomous vehicle based on the determined reaction time.

16. The medium of claim 15, wherein the positional relationship includes a predicted trajectory of the first object during the set time interval.

17. The medium of claim 15, wherein determining the one or more lane segments to be occluded includes identifying an area that is blocked from a field of view of the autonomous vehicle based on the positional relationship.

18. The medium of claim 17, wherein identifying the area that is blocked from the field of view of the autonomous vehicle based on the positional relationship includes:
    projecting the field of view of the autonomous vehicle from a location of the autonomous vehicle; and determining the one or more lane segments that are behind the first object relative to the projected field of view.

19. The medium of claim 15, wherein:

the second object is a type of vehicle associated with a nominal human actor; and determining the reaction time includes predicting when the nominal human actor associated with the second object will react to the autonomous vehicle.

20. The medium of claim 19, wherein predicting when the nominal human actor associated with the second object will react to the autonomous vehicle includes determining when a field of view of the nominal human actor includes a minimum amount of the autonomous vehicle.

* * * * *